United States Patent [19]

Sciarra et al.

[11] Patent Number: 5,697,115
[45] Date of Patent: Dec. 16, 1997

[54] CLEANING APPARATUS WITH TRIANGULAR SHAPED MOUNT FOR ATTACHMENT AND QUICK DISCONNECT

[75] Inventors: James F. Sciarra, North Haven; Patrick N. Gutelius, Monroe; Paul H. Johnson, New Canaan, all of Conn.

[73] Assignee: Black & Decker Inc., Newark, Del.

[21] Appl. No.: 639,661

[22] Filed: Apr. 29, 1996

[51] Int. Cl.$^6$ .............................. A47L 11/14; A47L 11/16
[52] U.S. Cl. ............................ 15/21.1; 15/28; 15/97.1; 403/348
[58] Field of Search ........................... 15/21.1, 22.1, 15/23, 28, 49.1, 97.1, 97.2; 403/348, 349, 360

[56] References Cited

U.S. PATENT DOCUMENTS

| | | |
|---|---|---|
| D. 199,115 | 9/1964 | Wedemeyer . |
| D. 200,293 | 2/1965 | Polatchek . |
| D. 203,254 | 12/1965 | Florian . |
| D. 219,790 | 1/1971 | Rhodes . |
| D. 226,043 | 1/1973 | Wolff . |
| D. 226,941 | 5/1973 | Benty et al. . |
| D. 245,883 | 9/1977 | Tsuji et al. . |
| D. 245,948 | 10/1977 | Wolff . |
| D. 250,228 | 11/1978 | Long . |
| D. 257,747 | 1/1981 | MacGregor . |
| D. 259,076 | 5/1981 | Doyel . |
| D. 262,257 | 12/1981 | Sohn . |
| D. 263,998 | 4/1982 | Oberheim . |
| D. 281,035 | 10/1985 | Herzfeld . |
| D. 286,706 | 11/1986 | McCloskey . |
| D. 290,550 | 6/1987 | Tsuji et al. . |
| D. 290,551 | 6/1987 | Huen . |
| D. 300,185 | 3/1989 | Suzuki . |
| D. 301,398 | 6/1989 | Cheung . |
| D. 305,480 | 1/1990 | Yuen . |
| D. 313,890 | 1/1991 | Machuron . |
| D. 321,596 | 11/1991 | Zierhut . |
| D. 352,828 | 11/1994 | Chen . |
| 931,327 | 8/1909 | Manzel . |
| 1,119,392 | 12/1914 | Bernett . |
| 1,138,926 | 5/1915 | Bernett . |
| 1,373,206 | 3/1921 | Sharples . |
| 2,337,402 | 12/1943 | Mills . |
| 2,527,256 | 10/1950 | Jackson . |
| 2,561,279 | 7/1951 | Holt . |
| 2,733,465 | 2/1956 | Holt . |
| 2,799,035 | 7/1957 | Pfluger . |
| 2,849,736 | 9/1958 | Kohle . |
| 3,162,876 | 12/1964 | Aronsen et al. ............... 15/28 |
| 3,251,086 | 5/1966 | Springer . |
| 3,289,231 | 12/1966 | Minton et al. . |
| 3,343,192 | 9/1967 | Goldstein et al. ............. 15/23 |
| 3,396,417 | 8/1968 | Starr . |
| 3,417,417 | 12/1968 | Rhodes . |
| 3,423,781 | 1/1969 | Henson . |
| 3,600,735 | 8/1971 | Jerabeck . |
| 3,734,548 | 5/1973 | Kieves ........................... 403/360 |
| 4,158,246 | 6/1979 | Meadows et al. . |
| 4,168,560 | 9/1979 | Doyel . |
| 4,906,147 | 3/1990 | Frieseinger et al. . |
| 4,917,525 | 4/1990 | Duncan . |

(List continued on next page.)

FOREIGN PATENT DOCUMENTS

| | | | |
|---|---|---|---|
| 519315 | 12/1955 | Canada ............................ | 15/28 |
| 3615918 | 11/1987 | Germany ......................... | 15/28 |
| 2126472 | 3/1984 | United Kingdom ............. | 15/28 |

Primary Examiner—David Scherbel
Assistant Examiner—Terrence Till
Attorney, Agent, or Firm—Barry E. Deutsch

[57] ABSTRACT

A cleaning apparatus having a housing, a motor, a transmission, an attachment stud, and a cleaning attachment removably connected to the stud. The stud has a leading section with a general triangular block shape and three generally triangular shaped cantilevered tips. The stud is received through a generally triangular shaped aperture in the cleaning attachment. The apparatus can reverse the normal rotation direction of the stud to allow the cleaning attachment to quickly disconnect from the stud without a user having to hold the cleaning attachment.

14 Claims, 12 Drawing Sheets

U.S. PATENT DOCUMENTS

| | | |
|---|---|---|
| 4,943,182 | 7/1990 | Hoblingre . |
| 4,984,339 | 1/1991 | Provost et al. . |
| 5,026,223 | 6/1991 | Hunt . |
| 5,138,735 | 8/1992 | Kusz et al. . |
| 5,201,100 | 4/1993 | Cardinale . |
| 5,261,140 | 11/1993 | Szymanski ............................ 15/49.1 |
| 5,289,605 | 3/1994 | Armbruster ............................ 15/28 |
| 5,397,196 | 3/1995 | Boiret et al. . |
| 5,495,632 | 3/1996 | Baker . |
| 5,551,114 | 9/1996 | Lee ............................ 15/28 |

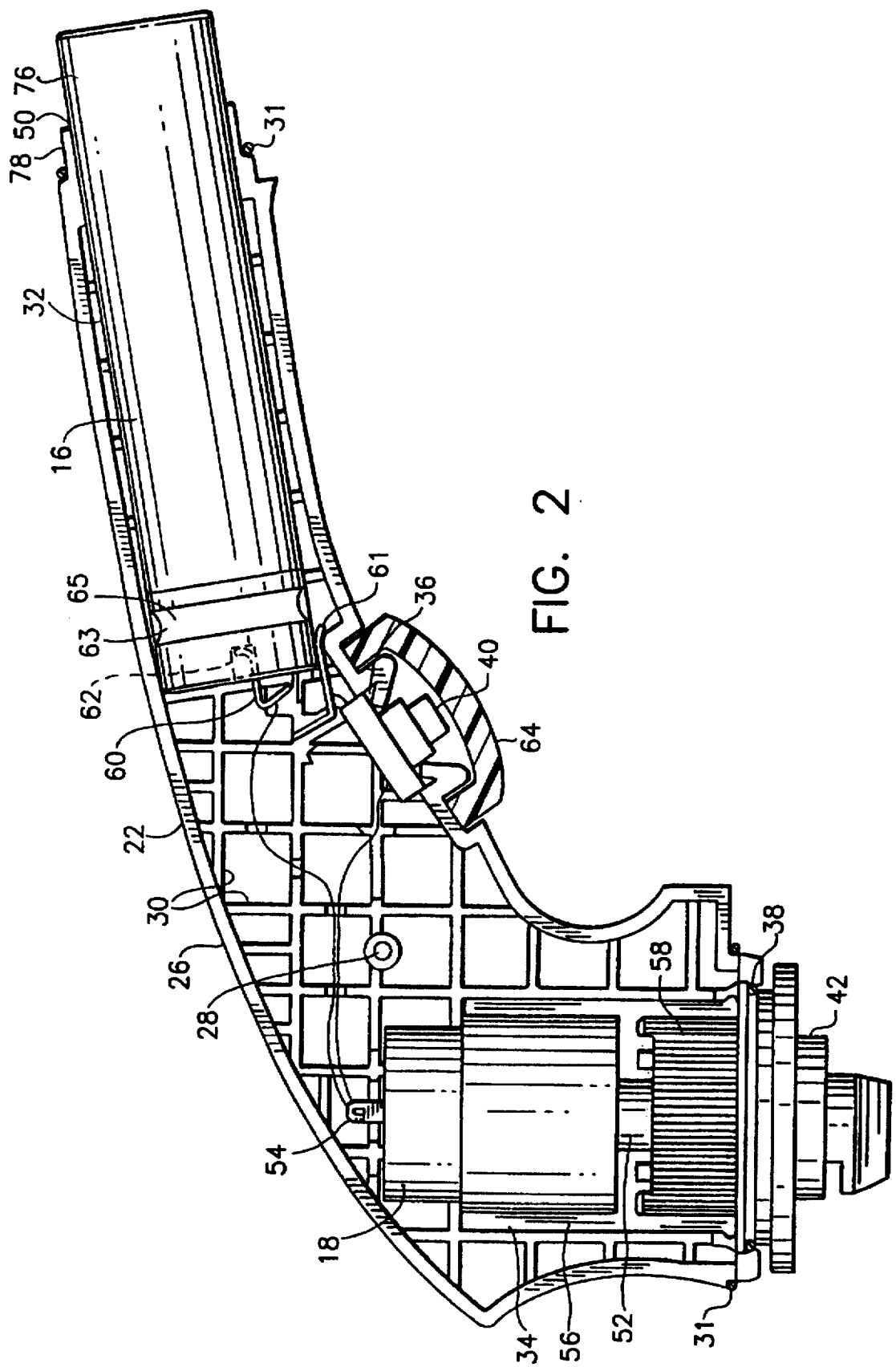

CLEANING APPARATUS WITH TRIANGULAR SHAPED MOUNT FOR ATTACHMENT AND QUICK DISCONNECT

BACKGROUND OF THE INVENTION

1. Field of the Invention

The present invention relates to a motorized cleaning device and, more particularly, to a device with a removable cleaning attachment.

2. Prior Art

Various different types of attachments have been used to attach removable attachments to hand held motorized tools in the past. Some of these old designs include snap detents and two bladed bayonet mounts. U.S. Pat. No. 4,662,024 discloses a floor maintenance machine with a hub having three lugs and a coupling device with a mating aperture. U.S. Pat. Nos. 2,561,279 and 3,600,735 show similar designs with biasing springs. Various types of removable connecting mounts can be found in the following U.S. Pat. Nos.:

| U.S. Pat. 3,251,086 | U.S. Pat. 1,373,206 |
| --- | --- |
| U.S. Pat. 3,423,781 | U.S. Pat. 2,527,256 |
| U.S. Pat. 2,337,402 | U.S. Pat. 2,733,465 |
| U.S. Pat. 2,799,035 | U.S. Pat. 931,327 |
| U.S. Pat. 1,119,392 | U.S. Pat. 1,138,926 |
| U.S. Pat. 4,906,147 | U.S. Pat. 4,917,525 |
| U.S. Pat. 4,943,182 | U.S. Pat. 5,026,223 |
| U.S. Pat. 5,138,735 | U.S. Pat. 5,397,196 |

Other U.S. Patents that relate to cleaning devices include the following:

| U.S. Pat. 4,168,560 | U.S. Pat. 4,168,560 |
| --- | --- |
| U.S. Pat. 2,849,736 | U.S. Pat. 3,289,231 |
| U.S. Pat. Des. 199,115 | U.S. Pat. Des. 200,293 |
| U.S. Pat. Des. 203,254 | U.S. Pat. Des. 219,790 |
| U.S. Pat. Des. 226,043 | U.S. Pat. Des. 226,941 |
| U.S. Pat. Des. 245,883 | U.S. Pat. Des. 245,948 |
| U.S. Pat. Des. 250,228 | U.S. Pat. Des. 257,747 |
| U.S. Pat. Des. 259,076 | U.S. Pat. Des. 262,257 |
| U.S. Pat. Des. 263,998 | U.S. Pat. Des. 281,035 |
| U.S. Pat. Des. 286,706 | U.S. Pat. Des. 290,550 |
| U.S. Pat. Des. 290,551 | U.S. Pat. Des. 300,185 |
| U.S. Pat. Des. 301,398 | U.S. Pat. Des. 305,480 |
| U.S. Pat. Des. 313,890 | U.S. Pat. Des. 321,596 |
| U.S. Pat. Des. 352,828 | |

SUMMARY OF THE INVENTION

In accordance with one embodiment of the present invention, a cleaning apparatus is provided comprising a housing, a motor located in the housing, and a transmission connecting an output shaft of the motor to a mount for attaching a cleaning attachment. The mount has a leading section with a general triangular block shape and a shaft section. The leading section has three generally triangular shaped cantilevered tips.

In accordance with another embodiment of the present invention, a cleaning attachment for use with a motorized cleaning apparatus is provided. The cleaning attachment has a frame and a cleaning section. The frame has a receiving area for locating an attachment mount of the apparatus therein. The receiving area has a generally triangular shaped aperture through which the attachment mount must pass through to enter the receiving area.

In accordance with another embodiment of the present invention, a cleaning apparatus is provided comprising a housing, a motor, and a cleaning attachment removably connected to the motor by a removable mounting system. A first one of the members of the removable mounting system includes a mounting stud having a leading section with a generally triangular block shape and a shaft section located behind the leading section. A second one of the members of the mounting system has a receiving area with the mounting stud being located therein. The receiving area has a generally triangular shaped aperture into the receiving area through which the leading section of the mounting stud is passed through.

In accordance with another embodiment of the present invention, a hand held cleaning apparatus is provided comprising a housing, a motor, a cleaning attachment, and means for disconnecting the cleaning attachment. The motor is located in the housing. The cleaning attachment is removably attached to the motor. The means for disconnecting the cleaning attachment can disconnect the attachment from the motor and comprises means to reverse direction of rotation of the motor.

BRIEF DESCRIPTION OF THE DRAWINGS

The foregoing aspects and other features of the invention are explained in the following description, taken in connection with the accompanying drawings, wherein:

FIG. 2 is a schematic cross sectional view of portions of the apparatus shown in FIG. 1;

DETAILED DESCRIPTION OF THE PREFERRED EMBODIMENT

Figure 1:
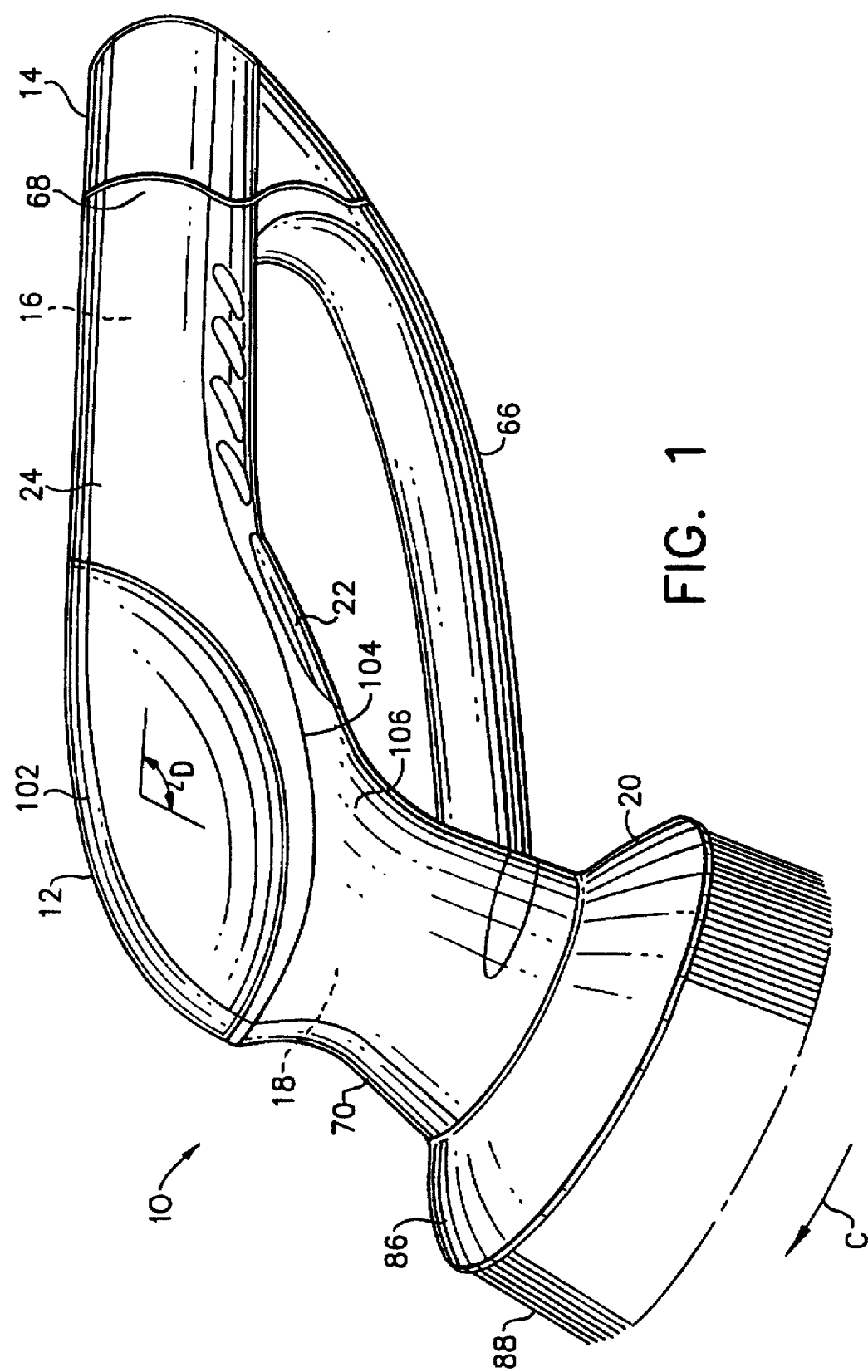
FIG. 1 is a perspective view of a battery operated cleaning apparatus incorporating features of the present invention.

Referring to FIG. 1, there is shown a perspective view of a battery operated cleaning apparatus 10 incorporating features of the present invention. Although the present invention will be described with reference to the embodiments shown in the drawings, it should be understood that features of the present invention can be embodied in various alternative forms of embodiments. In addition, any suitable size, shape or type of elements or materials could be used.

Figure 2A:
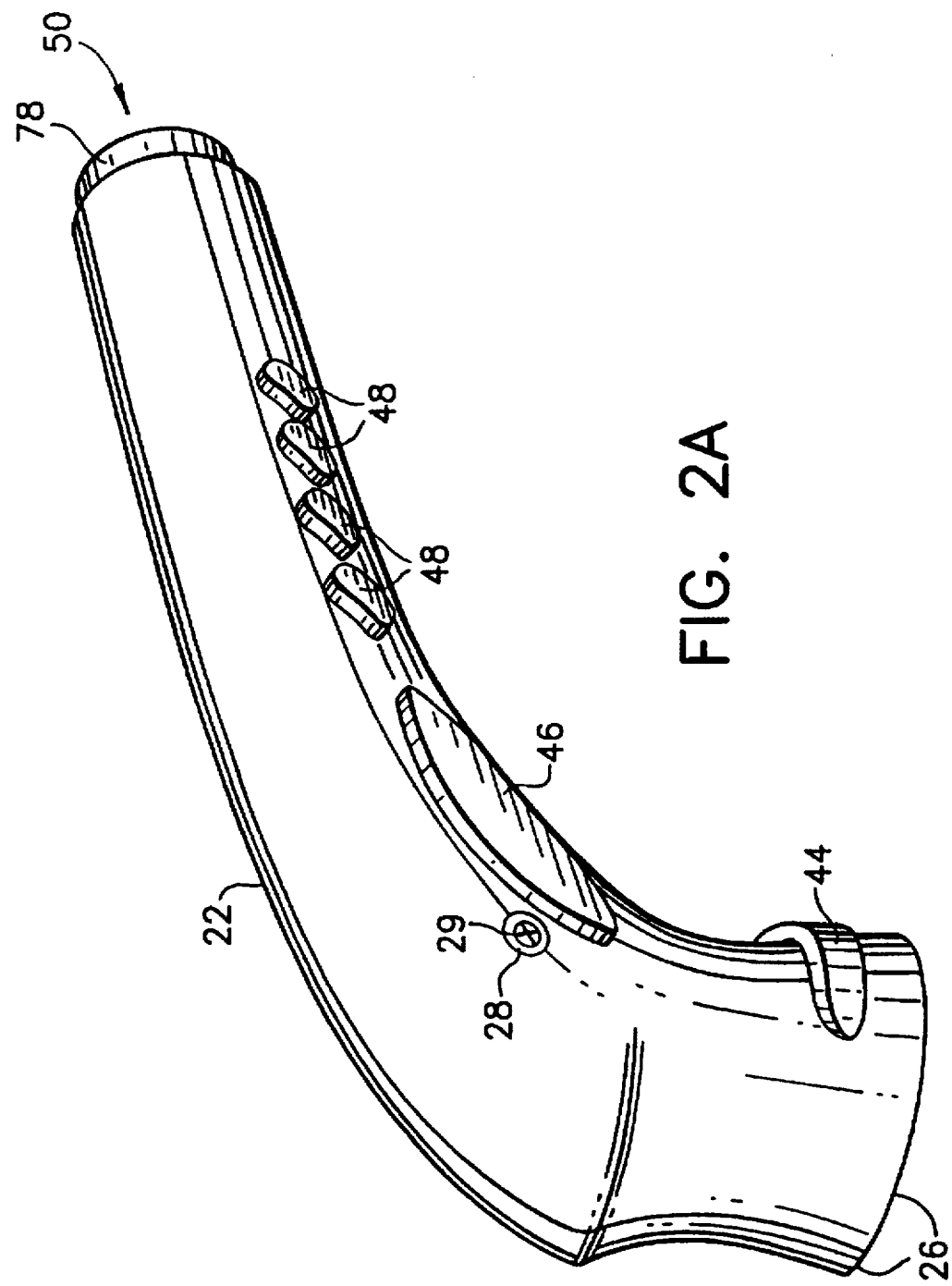
FIG. 2A is a perspective view of the apparatus shown in FIG. 1 without the cover, battery cap, battery and cleaning attachment.

Referring also to FIG. 2, the apparatus 10 generally comprises a housing 12, a battery cap 14, a battery 16, a motor 18, and a cleaning attachment 20. Referring also to FIG. 2A, the housing 12 generally comprises a subassembly housing or shell 22 and a cover 24. The subassembly shell 22 comprises two half members 26; one of which is shown in FIG. 2. The two members 26 are basically mirror images of each other and held together by a single screw 29 at the holes 28 and metal rings 31 at the front and rear of the members 26. In an alternate embodiment, only one ring 31 is needed at the front of the shell 22. In another alternate embodiment, there might be no metal rings used. The interiors of the members 26 have a honeycomb configuration provided by structural strut sections 30. The members 26 also have four areas 32, 34, 36, 38 for receiving the battery 16, the motor 18, a switch 40, and an attachment mount 42, respectively.

The exterior of each member 26 has raised areas 44, 46, 48. When the two members 26 are assembled, as shown in FIG. 2, only three apertures are provided into the subassembly shell 22; the aperture in which the switch 40 is located, a rear battery entrance aperture 50 and a front aperture in which the mount 42 is located. The cover 24 is injection molded over the subassembly shell 22 as further described below. The cover 24 is preferably comprised of SANTOPRENE. SANTOPRENE is a trademark of Advanced Elastomer Systems of Akron, Ohio. The cover 24 (see FIG. 1) forms an outer skin over a majority of the subassembly shell 22. The cover 24 also forms a hand guard section 66. The hand guard section 66 extends along the bottom of the apparatus 10 between the rear end of the handle section 68 and the bottom of the front head section 70. This forms a loop. A user's fingers can extend into that loop.

Referring primarily to FIG. 2, the motor 18 is preferably a brushless DC motor with an output shaft 52 and electrical terminals 54. The motor 18 is located in a motor/gear support cage 56 before being placed between the two members 26. Also located in the cage 56 are gears 58 that form a transmission between the drive shaft 52 and the mount 42. In a preferred embodiment, the gears 58 form a planetary gear transmission to convert the high speed low torque output of the motor into a slower speed higher torque output for the tool. The advantages of this approach are robustness of a planetary gear system and over all smaller space requirements. The planetary gear approach is robust because it is forgiving in the sense that the unit doesn't require the tight manufacturing tolerances and the system has no side loads applied to the gears. The planetary gear approach is a physically smaller approach for this particular design approach in the regard that a tremendous reduction gear ratio is achievable without having a large space requirement with respect to distance for the motor centerline. However, in alternate embodiments, other gearing approaches could be used, such as spur gears, bevel gears, helical gears or worm gears. The motor 18 and cage 56 are received in the receiving aperture 34 such that it forms a structural support between the two members 26. This structural support cooperates with the structure of the members 26 for the purpose of withstanding compression during overmolding of the cover 24. The terminals 54 of the motor are connected by wires to the switch 40 and two spring contact terminals 60, 61. The terminals 60, 61 are located at the interior end of the battery receiving area 32. The battery receiving area 32 has a general tubular shape. The battery 16 has a general column shape with two coaxial terminals 62, 63. The first terminal 60 is located to make contact with the center terminal 62 of the battery 16. The second terminal 61 is located to make contact with the outer terminal 63 of the battery 16. The two battery terminals are generally coaxially located relative to each other at a single end of the battery 16. The battery 16 is preferably a rechargeable battery such as a VERSAPAK battery sold by Black & Decker (U.S.) Inc. VERSAPAK is a trademark of The Black & Decker Corporation of Towson, Md. However, any suitable type of battery could be used. In alternate embodiments, the apparatus could be modified to accept any suitable type of battery or batteries. In the embodiment shown, when the battery 16 is fully inserted into the battery receiving area 32, the rear end 76 of the battery extends out of the aperture 50 past the rear end of the housing. The two spring contact terminals 60, 61 form a frictional engagement with the two coaxial terminals 62, 63 of the battery 16. The terminal 61 does not extend into the annular groove 65 along the outer battery terminal. Therefore, the terminal 61 does not make a snap-lock retainment with the annular groove 65. In a preferred embodiment, the frictional forces between the spring contact terminals 60, 61 and the coaxial terminals 62, 63 is sufficient to retain the battery 16 inside the battery receiving area 32, even when the battery cap 14 is not connected to the housing 12, until intentionally removed by a user. However, in an alternate embodiment, this frictional engagement could be insufficient to mechanically retain the weight of the battery when the battery is vertically located below the spring contact terminals 60, 61.

The first terminal 60 is connected by a wire directly to one of the terminals 54 of the motor 18. The second terminal 61 is connected by a wire to the switch 40 which, in turn, is connected by a wire to one of the terminals 54 of the motor 18. The switch 40 is preferably a push-button ON/OFF switch. However, in alternate embodiments, any suitable type of switch could be used. The base of the switch 40 is stationarily positioned in the receiving area 36. Covering the switch 40 is a button cover 64. The button cover 64 is comprised of a flexible polymer material such that it can be deflected by a user's finger to actuate the switch 40.

Figure 3A:
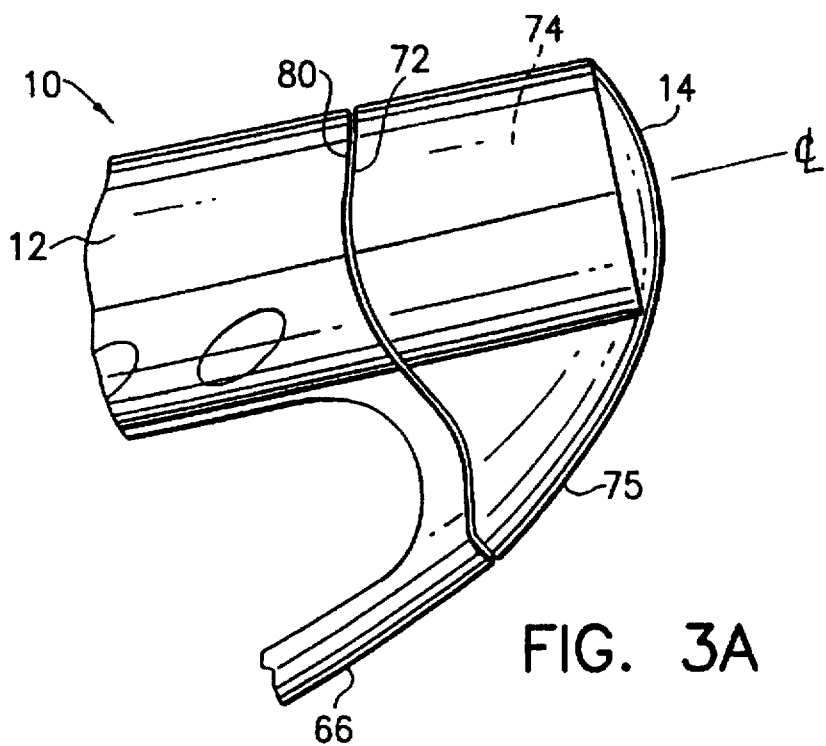
FIG. 3A is an enlarged elevational side view of the rear end of the apparatus shown in FIG. 1.
Figure 3B:
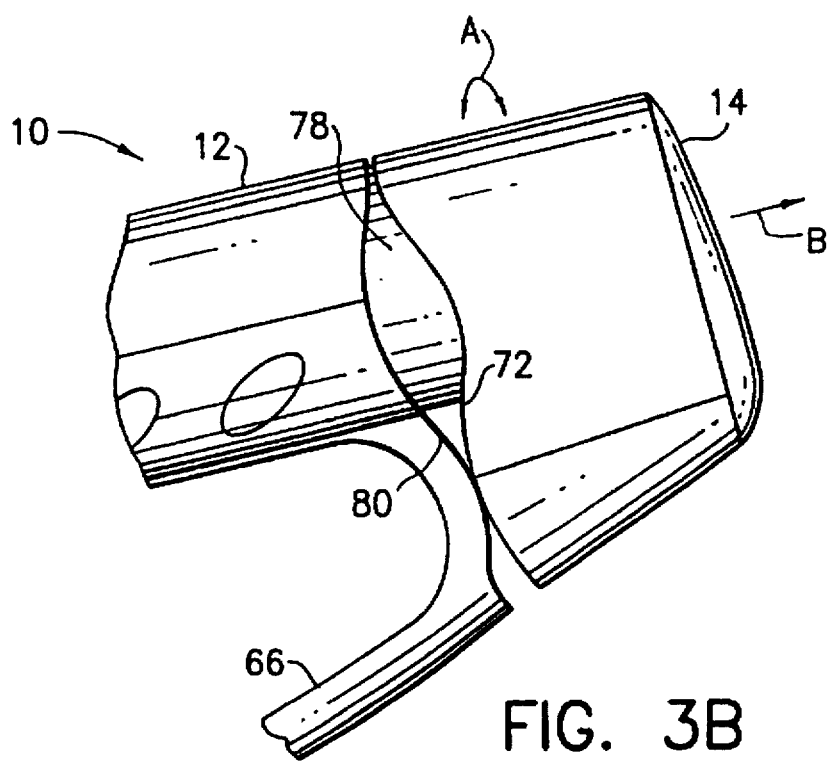
FIG. 3B is an elevational side view as in FIG. 3A with the battery cap axially rotated to a disconnection position.

Referring also to FIG. 3A, an enlarged view of the rear end of the apparatus 10 is shown. The battery cap 14 preferably made of a polymer material. The battery cap 14 has a front edge 72 with a wavy shape having peaks and valleys. The battery cap 14 also has a receiving area 74 for receiving the rear end 76 (see FIG. 2) of the battery 16. The rear end of the housing 12 has a ledge 78 (see FIG. 2). The cover 24 does not extend onto the ledge 78. The ledge 78 has a general ring shape at the entrance of the battery receiving area. The rear edge 80 of the cover 24 has a wavy shape with peaks and valleys that is complimentary to the front edge 72 of the battery cap 14. The rear edge 80 is located next to the ledge 78 and outward relative to the ledge. The battery cap 14 is friction mounted on the ledge 78 of the subassembly shell 22. The ledge 78 has a smooth outer surface such that only frictional grasping of the battery cap 14 on the ledge retains the battery cap to the ledge. To mount the battery cap 14 to the ledge 78, a user merely slides the cap onto the ledge by pushing the cap and housing 12 together. As seen in FIG. 3A, when the battery cap 14 is properly connected to the housing 12, the two edges 72, 80 mate with each other. In the embodiment shown, the frictional connection of the battery cap 14 to the ledge 78 is relatively strong and forms a watertight seal. To allow relatively easy removal of the battery cap 14, the user can use the edges 72, 80 to function as a cam. Referring also to FIG. 3B, a user merely axially rotates the battery cap 14 on the ledge 78 as indicated by arrow A. This causes the slopes leading up to the peaks to coact against each other to move the battery cap 14 in direction B. Thus, axial rotation of the battery cap relative to the housing causes the battery cap to be cammed away from the housing by the cam surfaces. As seen best in FIG. 3A, the battery cap 14 has a bottom section 75 that extends downward off center from the centerline of the mounting of the battery cap on the ledge. This off center section 75 has been provided to give a user better leverage in axially rotating the cap 14 on the ledge 78. The camming action between the cap 14 and the cover 24 need not completely push the cap 14 off the ledge 78, but preferably moves the cap 14 a majority of the length of the ledge 78. In alternate embodiments other types of battery cap removal assistance could be provided.

The battery cap 14 is provided to close off the aperture 50 and form a watertight seal with the ledge 78. In addition, the battery cap 14 functions as a retainer to keep the battery 16 attached to the terminals 60, 61 and inside the battery receiving area. As noted above, the terminal 61 does not interact with the groove 65 of the battery 16 to retain the battery. This has been purposely done to encourage users to only use the apparatus 10 with the battery cap 14 in place. As noted above, in one embodiment the frictional engagement between the terminals of the battery and the apparatus is insufficient to mechanically retain the weight of the battery when the battery is vertically oriented beneath the terminals 60, 61; even partially. In order to prevent the battery 16 from automatically sliding out of the housing, the user merely needs to slide the battery cap 14 onto the ledge 78. If a user tries to use the apparatus without the battery cap 14, and tilts the rear end of the housing down, the battery 16 will slide out of the housing under its own weight. This design allows an easy attachment and removal of the battery cap using an intuitive rotating motion and requires no secondary sealing gasket for the battery cap. Alternative designs could include a bayonet design or a snap-lid with a thumbnail lip.

Figure 4A:
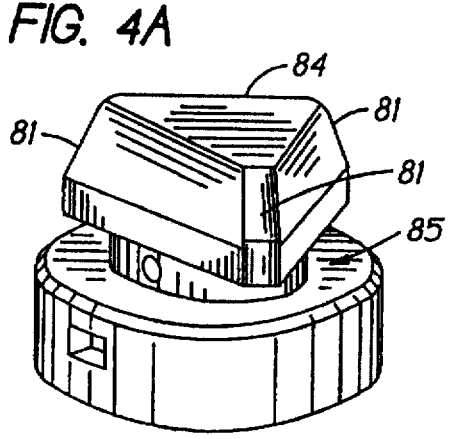
FIG. 4A is a perspective view of the bottom of the attachment mount shown in FIG. 2.
Figure 4B:
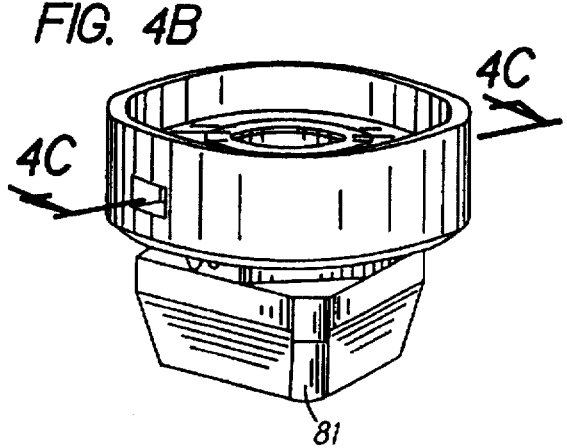
FIG. 4B is a perspective view of the top of the attachment mount shown in FIG. 4A.
Figure 4C:
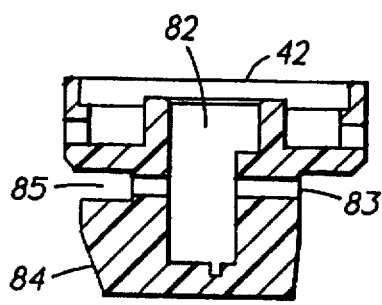
FIG. 4C is a cross sectional view of the mount shown in FIG. 4B taken along line 4C—4C.
Figure 4D:
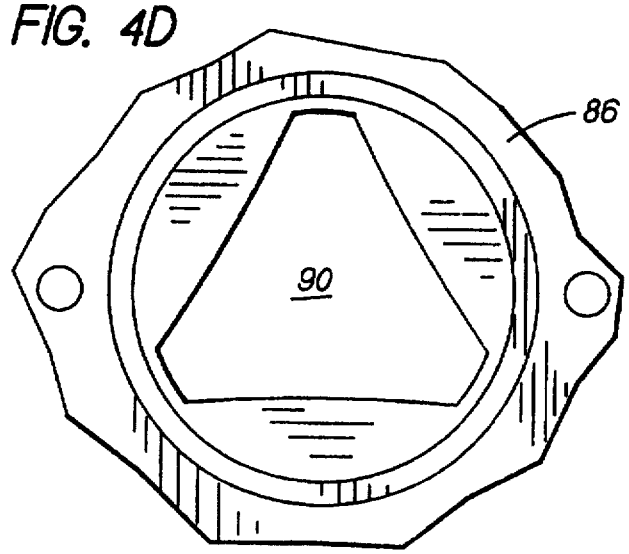
FIG. 4D is a plan top view of the mount aperture in the attachment shown in FIG. 1.
Figure 4E:
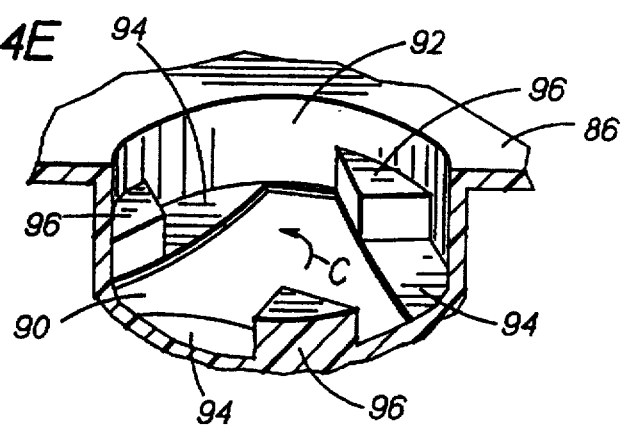
FIG. 4E is a perspective view with a cut away section showing an interior mount receiving area inside the housing of the attachment.

Referring now to FIGS. 2, 4A, 4B and 4C the attachment mount 42 generally comprises a one-piece polymer member that is attached to an output shaft from the transmission 58. The mount 42 includes a stud with a shaft receiving area 82 and a leading section 84 that has a general triangular block shape. The mount 42 also has a relatively narrow neck or shaft section 83 behind the leading section 84. This forms slots 85 behind cantilevered generally triangular shaped tips 81 of the leading section 84. Referring also to FIGS. 4D and 4E, portions of the cleaning attachment 20 are shown. The attachment 20 generally comprises a frame 86 and bristles 88 (see FIG. 1).

The bristles 88 are connected to the bottom of the frame 86 and extend therefrom. FIG. 4D shows a partial top plan view of the center of the frame 86. The frame 86 has a center generally triangular shaped aperture 90. The aperture 90 is about the same size and shape as the leading section 84 of the mount 42 such that the leading section 84 can pass therethrough. FIG. 4E is a partial perspective cutaway view of the frame 86 at the aperture 90. Located behind the aperture 90 is a receiving area 92. The receiving area 92 has three retaining shelves 94 and three stop blocks 96.

To attach the frame 86 to the mount 42, the mount section 84 is merely inserted through the aperture 90 into the receiving area 92. The frame 86 and mount 42 are then rotated relative to each other such that the triangular tips 81 of the leading section 84 move behind the shelves 94. The shelves 94 are received in the slots 85 of the mount 42. The stop blocks 96 stop the relative rotation of the mount 42 by contacting the triangular tips 81. This interlocking of the mount 42 and frame 86 keeps the attachment 20 connected to the mount 42. In the embodiment shown, the motor 18 and transmission 58 are only capable of rotating the mount 42 in one direction C shown in FIGS. 1 and 4E. In order to disconnect or remove the attachment 20, a user merely rotates the attachment 20 by hand in a direction reverse to direction C until the leading section 84 aligns with the aperture 90. Then, the attachment 20 can be separated from the mount 42. The areas of contact between the shelves 94 and the rear sides of the tips 81 is sufficiently large to provide sufficient frictional force to inhibit unintentional relative rotation between the mount 42 and the frame in a direction reverse to direction C without any additional biasing or holding between the two. Thus, because only friction is being used to prevent relative rotation in a direction reverse to direction C, a user only needs to use minimal force to rotate the cleaning attachment 20 in a disconnection direction. Therefore, the user does not need to grab a large area of the cleaning attachment, which might otherwise be very dirty from use. This minimizes the user's hands getting dirty or coming into contact with caustic cleaning material. In an alternate embodiment a short spiral mounting system could be provided. Other alternatives could include a one or two blade bayonet design. However, the three blade or trilobular bayonet design of the mount 42 is preferred because it is a simple attachment and removable by executing about a ⅙ turn. A counterclockwise engaging system could also be used rather than a clockwise engaging system. Another alternate embodiment could include the cleaning attachment having the mount and the apparatus having the receiving area.

Figure 5A:
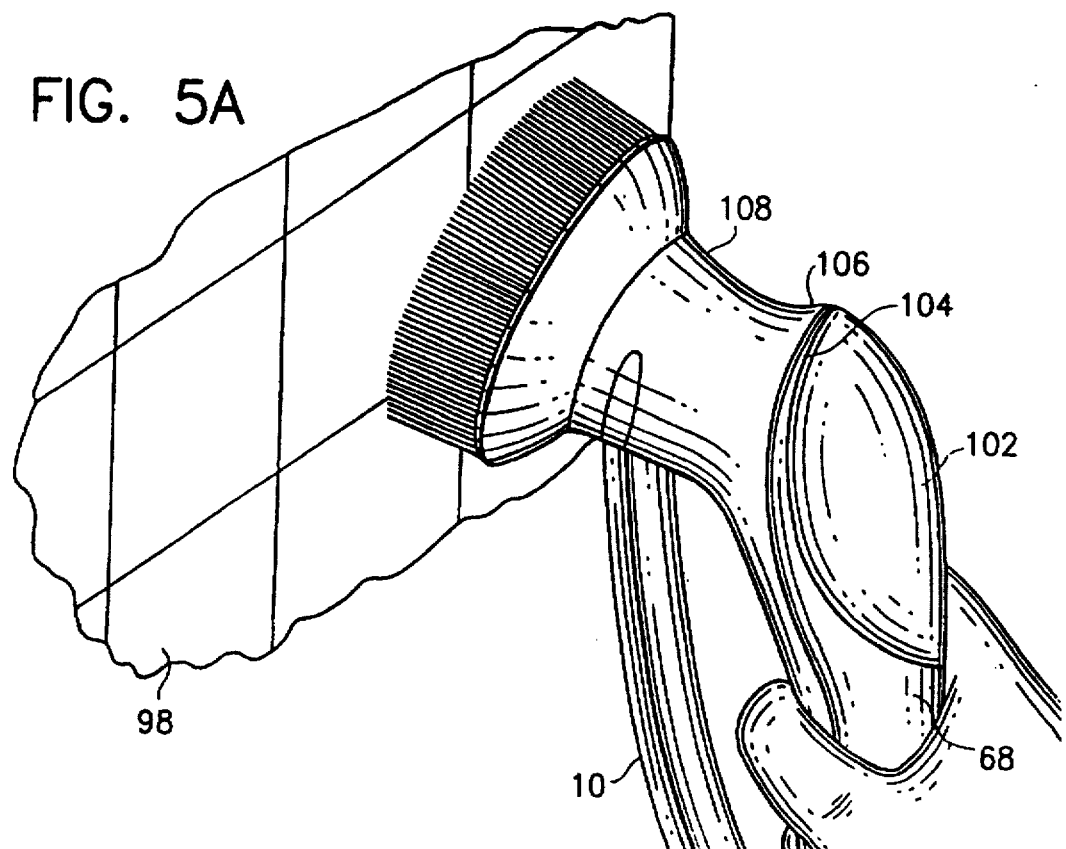
FIG. 5A is a schematic perspective view of the apparatus shown in FIG. 1 showing a user holding the apparatus at a first hand holding position.
Figure 5B:
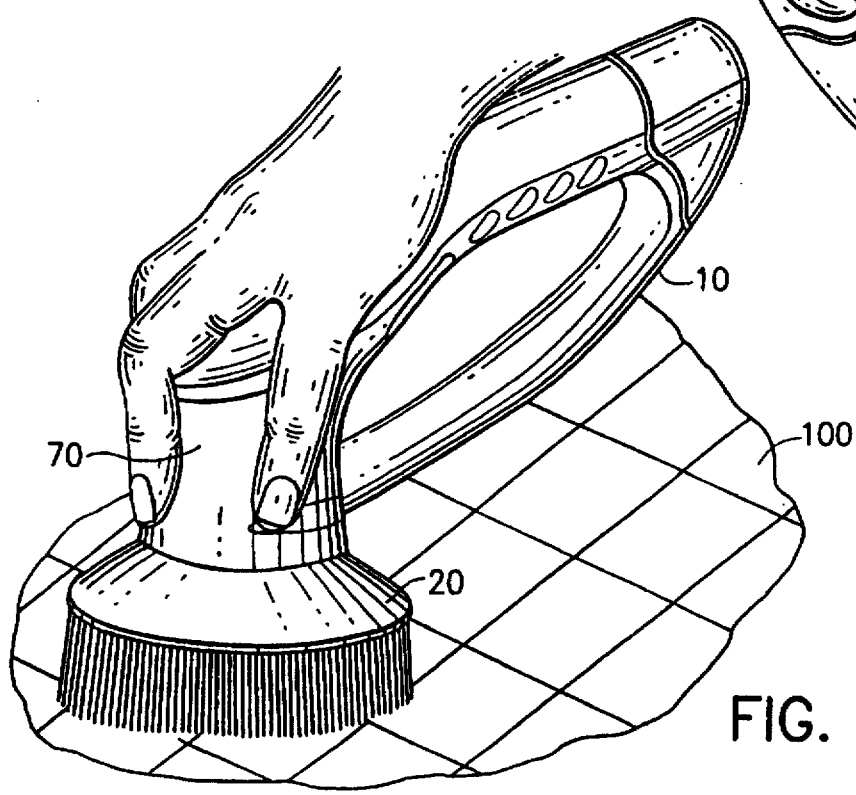
FIG. 5B is a schematic perspective view of the apparatus shown in FIG. 1 with a user holding the apparatus at a second hand holding position.

Referring now to FIGS. 5A and 5B, the apparatus 10 is shown with a user grasping the apparatus 10 at two different locations. More specifically, the housing 12 has been designed to provide two primary hand holding positions. "Primary hand holding position" is intended to mean a position in which a users' hand can comfortably and surely hold the apparatus during use; i.e.: a location specifically and intentionally designed for the user to hold the apparatus during use. The two primary hand holding positions allow a user to properly hold the apparatus 10 based upon the type of attachment being used and/or the type of cleaning task. The shape of the housing also allows for easy articulation around items, such as bathroom fixtures. FIG. 5A shows a user grasping the apparatus 10 at the handle section 68 and cleaning tiles on a wall 98. The handle section 68 has a general tubular shape, with the battery 16 therein, for this purpose. The handle section 68 extends rigidly from a top rear portion of the head section. This holding position allows the user to scrub areas at a distance, such as above the user's head. The button cover 64 and switch 40 (see FIG. 2) are suitably located to be depressed by the user's index finger in this holding position. The hand guard section 66 protects the user's knuckles from hitting the wall 98. FIG. 5B, on the other hand, shows the user grasping the apparatus 10 at the top of the head section 70 and cleaning tiles on a floor 100. As seen in FIG. 1, the top of the head section 70 has been provided with a curved palm contact area 102 and a ridge 104 with an inwardly and downwardly sloping surface 106 below it. The ridge 104 is located at a perimeter of the top surface of the head section 70. A bottom portion 108 of the head section 70 has a general bell shaped outer perimeter. The bottom portion 108 has a center axis that is angled relative to a center axis of the handle section 68 at an angle D (see FIG. 1) of about 95° to about 120°. In a preferred embodiment, the angle D is about 100°. However, any suitable angle could be provided. The surface 106 extends around a majority of the top surface of the head section. The curve of the top surface area 102 of the head section 70 has been configured to be matingly or comfortably received in a user's palm with the user's fingers wrapping around the ridge 104 and along the sloping surface 106. This shape provides for a grasping position as shown in FIG. 5B where the user can locate his hand directly behind the cleaning attachment 20. This grasping position allows the user to exert additional force for the cleaning attachment 20 against the floor 100 with minimal additional effort, such as when using a relatively large diameter rotary scrub attachment or for heavy duty scrubbing.

Figure 6:
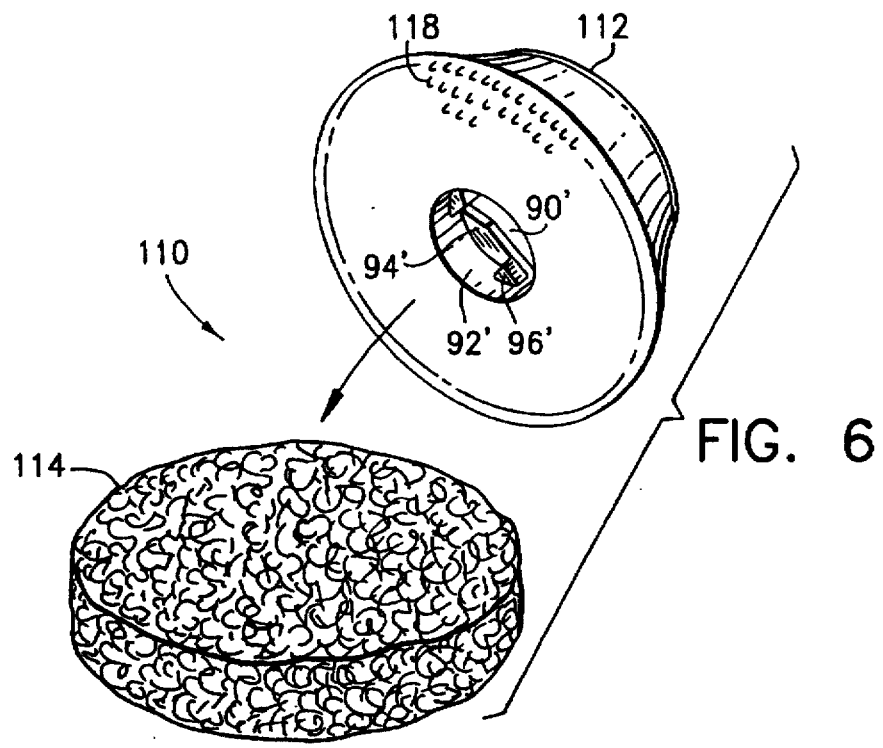
FIG. 6 is an exploded perspective view of an alternate embodiment of an attachment for use with the apparatus shown in FIG. 1.
Figure 7A:
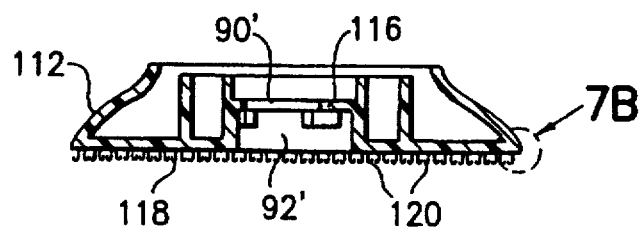
FIG. 7A is a cross sectional view of the housing shown in FIG. 6.
Figure 7B:
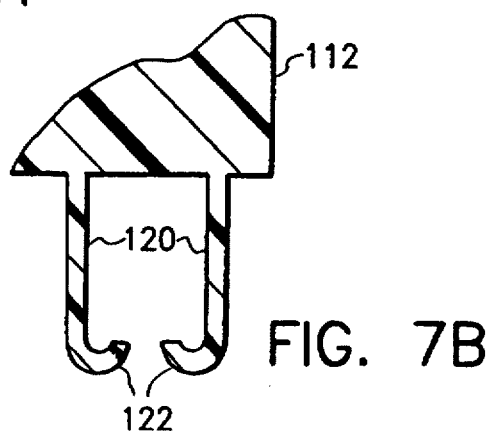
FIG. 7B is an enlarged view of section 7B shown in FIG. 7A.

Referring now to FIG. 6, an exploded schematic perspective view of an alternate embodiment of a cleaning attachment for use with the apparatus 10 is shown. The attachment 110 generally comprises a frame 112 and a cleaning section 114. Referring also to FIGS. 7A and 7B, the frame 112 is comprised of a one-piece molded plastic or polymer member. The frame 112 has a mounting section 116 for the mount 42 of the apparatus 10 and a cleaning pad attachment surface 118 on its bottom. The mounting section 116 is substantially the same as that shown in FIGS. 4D and 4E. The mounting section 116 has a generally triangular shaped aperture 90' into a receiving area 92' with three shelves 94' and three blocks 96'. In an alternate embodiment, the frame 112 could be comprised of multiple members fixedly connected to one another. Other types of mounting sections could be provided such that the attachment could be used with other types of cleaning apparatus. The bottom attachment surface 118 generally comprises a plurality of integrally formed hooks 120. The hooks 120 are resiliently deflectable such that the distal curved section 122 can be deflected to a partially straightened shape. Examples of similar hooks can be found in U.S. Pat. Nos. 4,984,339 and 5,201,100. The cleaning section 114, in the embodiment shown, is a cleaning pad having a general disk or puck shape. The pad 114 is preferably comprised of intermeshed fibers; similar to a steel wool pad. Preferably, the pad 114 is comprised of polymer fibers such as a SCOTCH-BRITE or BRUSHLON pad. SCOTCH-BRITE and BRUSHLON are trademarks of Minnesota Mining and Manufacturing Company of St. Paul Minn.

In order to attach the pad 114 to the frame 112, a user merely places the pad 114 against the attachment surface 118 and applies pressure. The hooks 120 extend into the pad 114 and make a hooking attachment with the fibers of the pad 114. This completes assembly of the cleaning attachment 110. The pad 114 can be relatively easily removed from the frame 112 for replacement merely by pulling the pad 114 off of the hooks 120. The hooks 120 merely resiliently deflect to allow for disconnection of the pad 114. However, during normal use of attachment 110, the connection of the pad to the frame is sufficiently to prevent the pad from coming off of the frame or significantly moving on the surface 118. In alternate embodiments, additional or alternative means could be provided to attach the pad to the frame and, different types of cleaning sections could be provided.

Figure 8A:
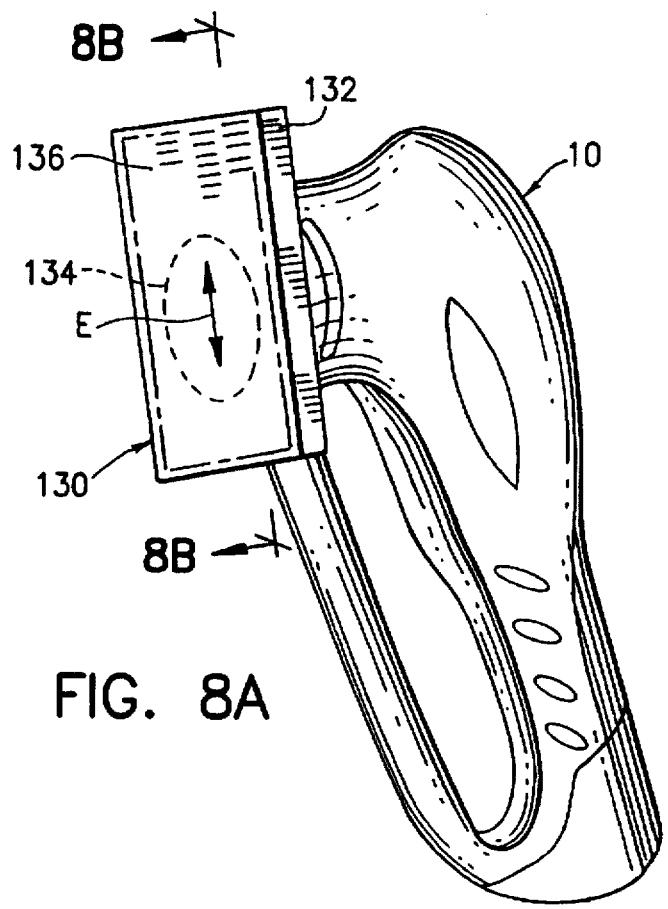
FIG. 8A is a schematic perspective view of the apparatus shown in FIG. 1 with an alternate embodiment of a cleaning attachment attached thereto.
Figure 8B:
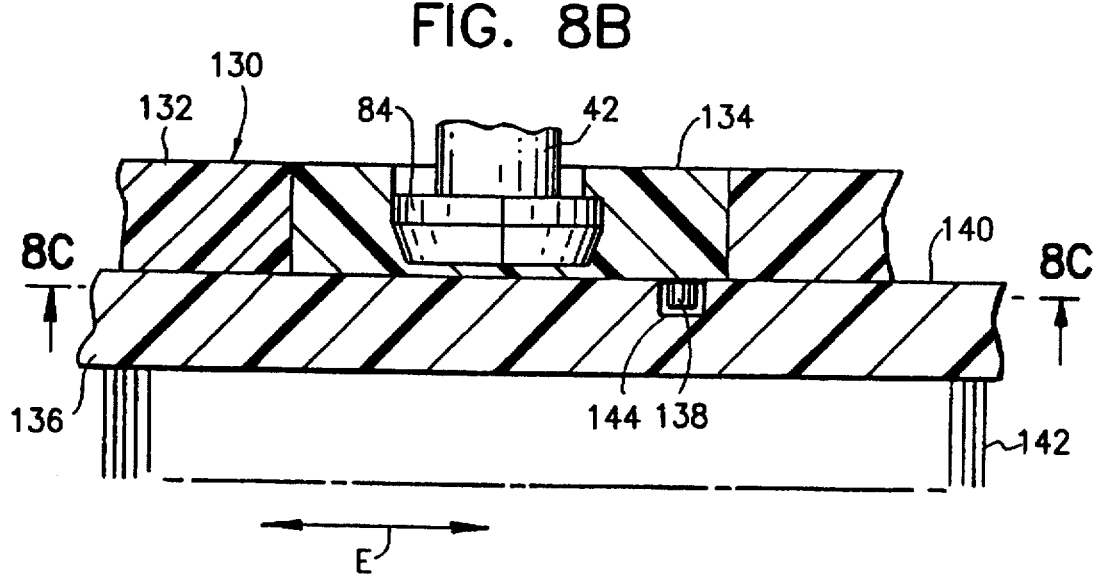
FIG. 8B is a partial cross sectional view of the attachment shown in FIG. 8A taken along line 8B—8B.
Figure 8C:
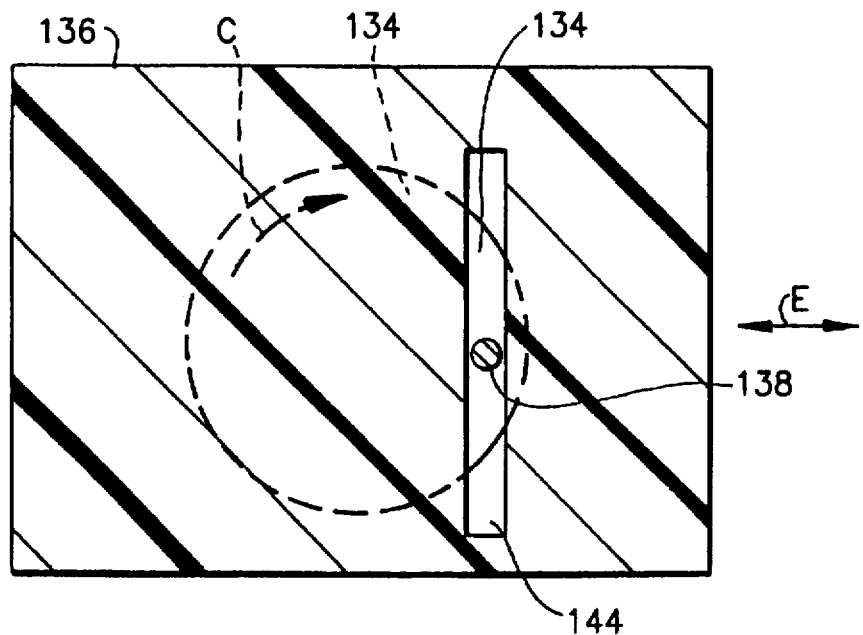
FIG. 8C is a cross sectional view of the apparatus shown in FIG. 8B taken along line 8C—8C.
Figure 8D:
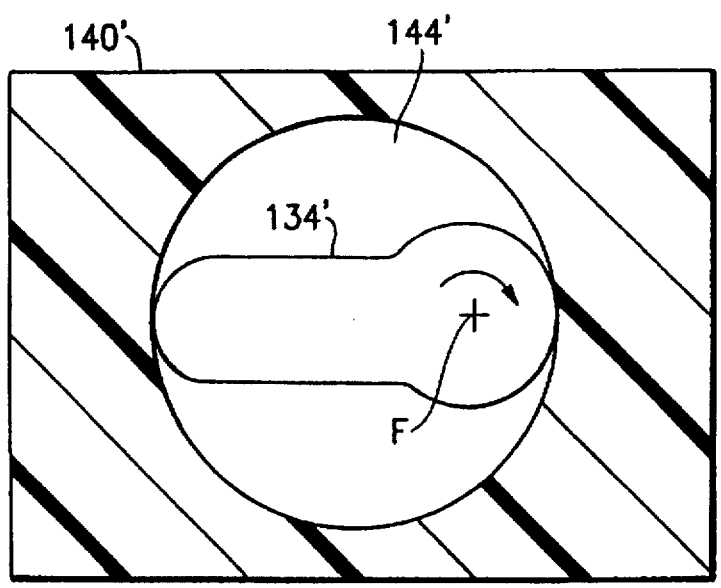
FIG. 8D is a schematic cross sectional view of an alternate embodiment of a cleaning attachment for use with the apparatus shown in FIG. 8A.

Referring now to FIG. 8A, another alternate embodiment of a cleaning attachment is shown connected to the apparatus 10. The cleaning attachment 130 generally comprises a housing 132, a rotating drive 134, and a cleaning section 136. Referring also to FIGS. 8B and 8C, the rotating drive 134 is suitably sized and shaped to receive the mount 42 of the apparatus 10. More specifically, the rotating drive 134, similar to that shown in FIGS. 4D and 4E, has a generally triangular shaped aperture, three shelves, three blocks, and a receiving area for the leading section of the mount 42. The rotating drive 134 is rotatably connected to the housing 132 and has a drive pin 138 extending from its bottom. The cleaning section 136 generally comprises a frame 140 and bristles 142 attached to the bottom side of the frame. The frame 140 is connected to the housing 132 to allow for sliding reciprocating linear movement, as shown by arrow E, relative to the housing 132. The frame 140 includes a laterally extending groove 144 (seen best in FIG. 8C) on its top side. The drive pin 138 extends into the groove 144. When the drive 134 is rotated by the mount 42, the drive pin 138 is rotated as indicated by arrow C in FIG. 8C. The drive pin 138 is able to laterally move in the groove 144, but otherwise causes the frame 140 to reciprocate back and forth on the housing 132 as indicated by arrow E. Thus, the axial rotational driving motion of the mount 42 is transformed into linear reciprocating motion. In alternate embodiments, other types of mechanical connections could be provided among the members of the cleaning attachment and any suitable type of cleaning section could be provided. FIG. 8D shows another alternate embodiment. In this embodiment the rotating drive 134' is an elongate yoke with a center of rotation F. The frame 140' of the cleaning section has a drive aperture 144' with the drive 134' therein. As the drive 134' is rotated, the frame 140' is moved in an orbital direction. Thus, the axial rotational movement of the drive 134' is converted into orbital motion of the cleaning attachment.

Figure 9A:
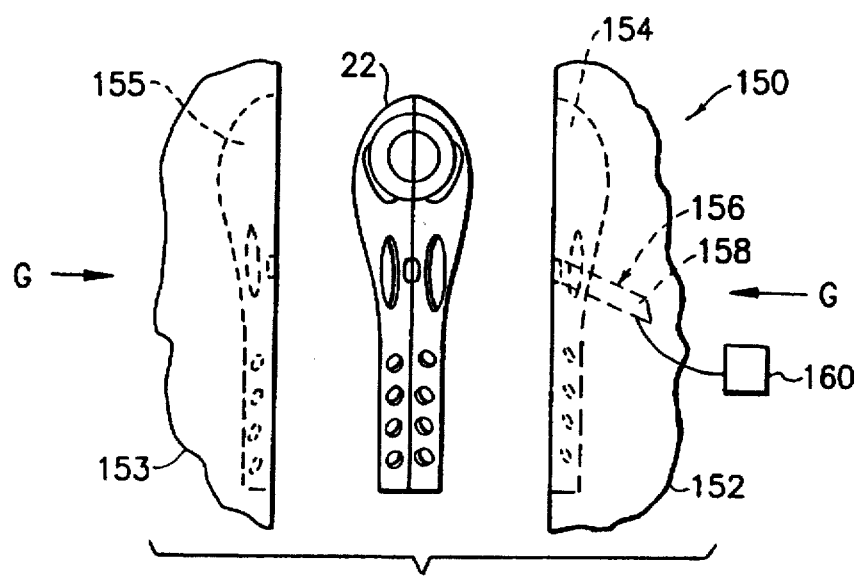
FIG. 9A is a schematic view of the subassembly housing shown in FIG. 2A being positioned into a mold.
Figure 9B:
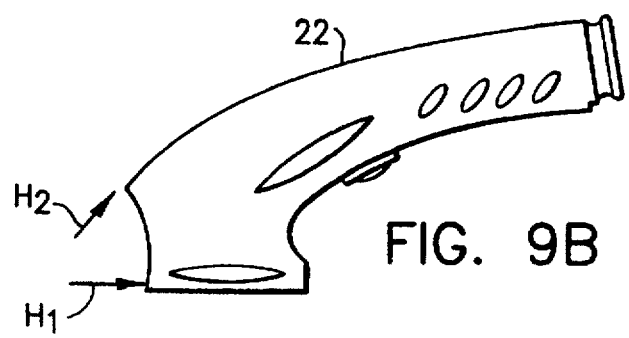
FIG. 9B is an elevational side view of the subassembly housing shown in FIG. 2A showing where material is injected at the subassembly housing inside the mold shown in FIG. 9A.

Referring now to FIG. 9A, the subassembly shell 22 shown in FIG. 2A is shown being positioned into a mold 150 for overmolding the cover 24 onto the shell. The mold 150 generally comprises two half mold members 152, 153 that have receiving areas 154, 155 therein. Preferably, the molding apparatus has a robotic arm that moves the shell 22 into and out of the mold 150. The robotic arm preferably has a stud that the shell 22 is mounted on. Referring also to FIG. 2A, the shell 22 is mounted on the stud with the stud being located through the rear aperture 50 and into the battery receiving area 32. This stably supports the shell 22 for movement into and out of the mold 150. Once the cover 24 is overmolded onto the shell 22, the members 26 of the shell 22 will be permanently connected to each other. Therefore, prior to insertion of the shell 22 into the mold 150, the two members 26 of the shell 22 are attached to each other by the screw 29 and rings 31 with the motor 18, transmission 58, switch 40, terminals 60, 61 and button cover 64 in place (see FIG. 2). Once the shell 22 is moved into the mold 150, the two mold members 152, 153 are moved inward, as indicated by arrows G, to sandwich the shell 22 inside the receiving areas 154, 155. The raised areas 44, 46, 48 of the shell 22 are contacted by the mold members 152, 153 inside the receiving areas 154, 155. This contact provides two functions. First, it seals off the top surfaces of the raised areas 44, 46, 48. Thus, when the material for the cover 24 is injected into the mold 150, the material is not molded over the top surfaces of the raised areas 44, 46, 48. Second, contact between the raised areas 44, 46, 48 and the mold 150 stationarily holds the shell inside the receiving areas 154, 155 during the injection molded process. Thus, a fixed uniform gap is established between the mold inside the receiving areas 154, 155 and the rest of the exterior of the shell 22. There are a few exceptions to this uniform gap; namely, at the area proximate the soon to be formed hand guard 66 and, at the rear ledge 78 and bottom of the head section 70 that are covered to prevent molding of the cover material over these areas. As shown in FIG. 9B, the material of the cover is injection molded at only two areas $H_1$ and $H_2$ at the front of the head section of the shell 22 at a relatively high pressure, such as about 3000 psi to about 5000 psi. The holding of the shell inside the mold at the raised areas 44, 46, 48 prevents the shell 22 from moving inside the mold 150 even with the relatively high injection pressure. Since the uniform gap between a majority of the shell outer surface and the walls of the mold inside the receiving areas 154,155 is maintained during molding, the cover 24 is molded onto the shell 22 with a substantially uniform thickness over a majority of the shell 22. The hand guard 66 is simultaneously formed.

In a preferred embodiment, the material of the shell 22 and the material of the cover 24 have similar melting points. Therefore, a melt bond occurs when the material of the cover 24 is injection molded onto the shell 22. This prevents the cover 24 from being peeled off of the shell 22. However, due to the similar melting points, precautions had to be taken to prevent the injection molding process from damaging the shell 22. In particular, the lower injection point $H_1$, is directly at the front metal ring 31 (see FIG. 2). The upper injection point $H_2$ is parallel to the top surface of the shell, not directly at the shell 22. Thus, the shell is not significantly damaged by the hot injection material.

Due to the relatively high injection pressure being used, in order to prevent damage to the switch 40, and to prevent the button cover 64 from being permanently inwardly deformed, or perhaps even dislodged, one of the mold members 152 has been provided with a protection device 156. The protection device 156 includes a slidable covering arm 158 and a mover 160. The arm 158 is slidingly mounted in a recess of the mold member 152 to project outward into the receiving area 154. The leading edge of the arm 158 is sized and shaped to cover and compress the button cover 64 against the shell 22 to prevent the injection molded material from inwardly deforming the button cover 64 and damaging the switch 40. However, the arm 158 does allow the cover 24 to be injected around the side perimeter of the button cover 64 and form a watertight seal therewith. The mover 160 can be any suitable type of mover, such as a motor, a hydraulic drive or a pneumatic drive, to move the arm 158 between extended and retracted positions. As noted above, the shell members 26 have structural strut sections 30 that form a honeycomb configuration. This is provided to support the outer walls of the shell 22 during the injection molding process. Also, as noted above, the motor 18 and gear cage 56 form structural supports for the shell 22. This is also to support the outer walls of the shell 22 during the relatively high pressure of the injection molding process. Thus, the motor 18 and the cage 56 also function as structural support members.

In an alternate embodiment, the motor 18 and/or cage 56 could be attached to the shell 22 after the cover 24 is molded over the shell 22. However, in such an alternate embodiment an insert should be used in place of the motor 18 and/or cage 56 during the overmolding process. The purpose of the insert would be to structurally support the shell during the overmolding process to prevent the shell from collapsing from the pressure during overmolding. The stud of the robotic arm (not shown) located in the battery receiving area 32 performs the same function at the handle section 68 to prevent collapse at the handle section during the overmolding process.

Once the molding process is complete, the mold 150 is opened and the shell with its new overmolded cover is removed by the robotic arm. There are many purposes to overmolding the cover 24 onto the shell 22. The cover 24 provides a waterproofing function. The cover 24 seals the majority of the joint between the two shell halves 26, seals the screw holes 28, and makes a seal with the button cover 64. With a seal at the mount 42 and the seal by the battery cap 14, the apparatus 10 can be used in wet locations without significant risk of being damaged by water, such as if the apparatus were accidentally dropped in a bucket of water during cleaning. The cover 24 also provides a relatively non-slippery surface over a majority of its surface. In wet environment uses this can be of great assistance to the user. The cover also provided a resilient deflectable surface over a majority of the apparatus 10 to resiliently absorb physical shocks, such as if the apparatus is accidentally dropped on a hard surface, such as a tile floor. This prevents damage to the apparatus and the surface it is dropped on. However, the thickness of the cover 24 on the shell 22 is not so thick as to take away from the attributes of the structurally rigid shell 22. Another advantage of the cover 24 is that it is molded integral with the hand guard 66 for a clean and smooth surface that does not have seams that could otherwise collect dirt. The top surfaces of the raised areas 44, 46, 48 are also substantially even with the outer surface of the cover 24 to provide a uniform and stylish appearance. The cover 24 also provides the cam surface 80 at the shelf 78. In alternate embodiments, the cover could be molded onto a shell of any suitable type of motorized hand tool. Alternative shapes of the shell and raised areas on the shell could also be provided. The hand guard could also have any suitable type of shape or, need not be provided. In alternate embodiments, an overmolded cover need not be provided, such as by using gaskets between members or using rubber boots placed over members.

Figure 10:
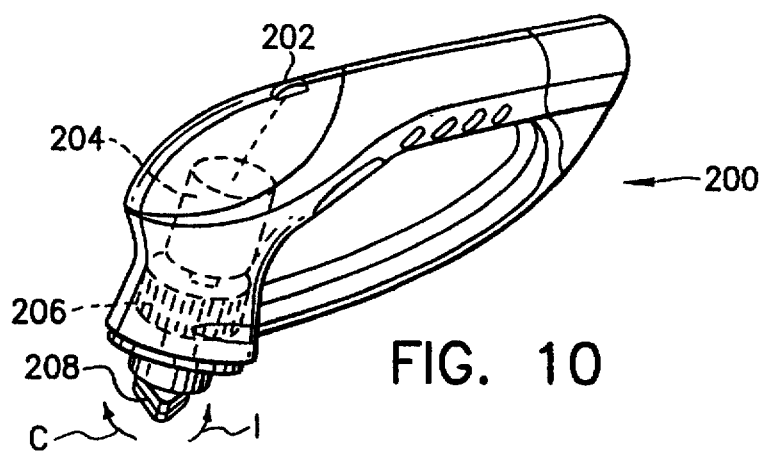
FIG. 10 is a schematic perspective view of an alternate embodiment of the apparatus shown in FIG. 1.

Referring now to FIG. 10, a schematic perspective view of an alternate embodiment of the cleaning apparatus is shown. The cleaning apparatus 200 is substantially the same as the apparatus 10 shown in FIG. 1. However, in this embodiment, the apparatus 200 includes a second cleaning attachment automatic disconnect button 202. The button 202 has a switch that is connected to the motor 204. During normal use of the apparatus 200 the motor and transmission 206 rotate the mount 208 in direction C. However, when a user actuates the button 202, the motor 204 rotates in a reverse direction. Therefore, the mount 208 is rotated in direction I which is reverse to direction C. Due to the fact that only frictional forces keep the frame of the cleaning attachment from rotating relative to the mount 208 in direction I, when the mount 208 is rotated in direction I the shelves of the attachment slip on the mount 208 such that the mount 208 aligns with the triangular aperture 90 (see FIG. 4E) of the attachment frame. The cleaning attachment can then merely fall off of the mount 208.

Therefore, a user does not need to touch the cleaning attachment to remove it from the apparatus 200. In an alternate embodiment, the button 202 could actuate a lever to control the direction of the transmission 206 rather than change the rotation direction of the motor. Alternatively, any suitable type of automatic cleaning attachment disconnect system could be used to allow the user to disconnect a cleaning attachment without having to touch the cleaning attachment. A variable speed control for the motor could also be provided. A liquid dispenser could also be added. In another alternate embodiment a swivel head could be provided or a head that is in-line with the handle. Preferably, the apparatus is compact enough to clean inside a bathroom sink, but can also be used to extend the reach of the user.

Figure 11B:
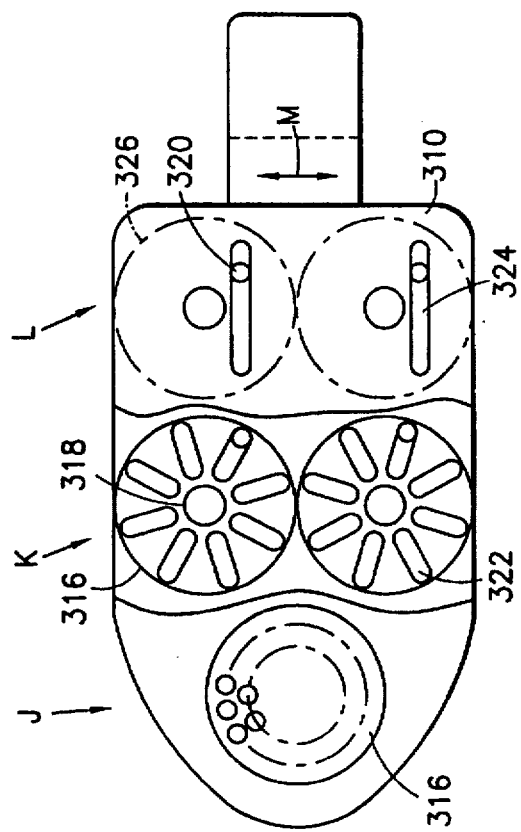
FIG. 11B is a schematic partial bottom view and sectional views of the apparatus shown in FIG. 11A.
Figure 11D:
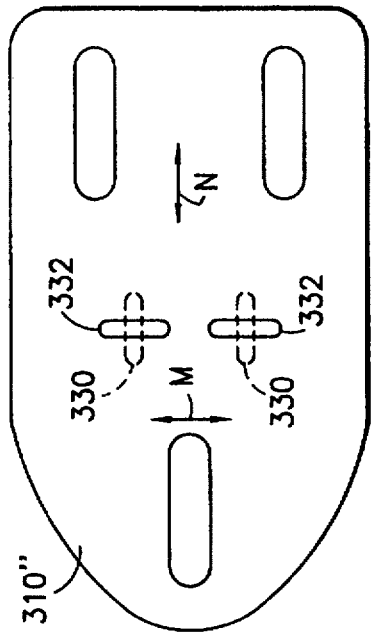
FIG. 11D is a plan top view of a motion plate used in an alternate embodiment of the apparatus shown in FIG. 11A.
Figure 11A:
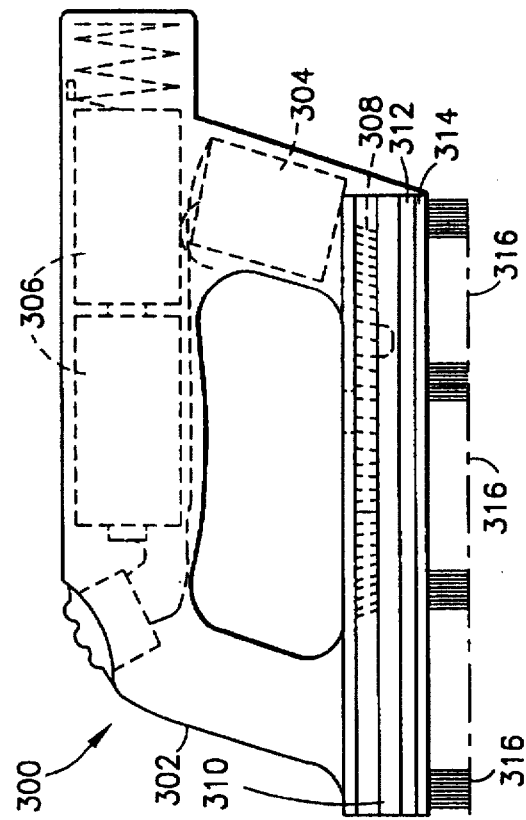
FIG. 11A is a schematic side elevational view of an alternate embodiment of the present invention.

Referring now to FIG. 11A, an alternate embodiment of a cleaning apparatus is shown. The cleaning apparatus 300 generally comprises a housing 302, a motor 304, batteries 306, a transmission 308, an actuating plate 310, a gasket 312, a cover 314 with studs, and five rotary shaped cleaning brushes 316. In this embodiment the housing 302 is made entirely of SANTOPRENE. The motor 304 rotates the drive gears of the transmission 308. The transmission rotates the five brushes 316. Referring also to FIG. 11B, a bottom view of the apparatus 300 is shown at section J, a schematic sectional view is shown at section K at the top of the brushes 316, and a schematic sectional view is shown at section L at the bottom of the actuating plate 310. The tops of the brushes 316 are rotatably mounted on studs 318 on the cover 314. Drive pins 320 from the gears of the transmission 308 extend into slots 322 in the tops of the brushes 316. The actuating plate 310 has slots 324. The drive pins 320 extend through the slots 324 from the gears 326 of the transmission. As the gears 326 are rotated by the motor 304, the drive pins 320 are rotated to reciprocatingly linearly move the actuating plate 310 from side to side as indicated by arrow M. This moves the cover 314 back and forth in direction M. The drive pins 320 also rotate the brushes 316 on their respective posts 318. The slots 322 provide clearance for off-center movement of the cover 314 and brushes 316 relative to the rotational axes of the gears 326.

Figure 11C:
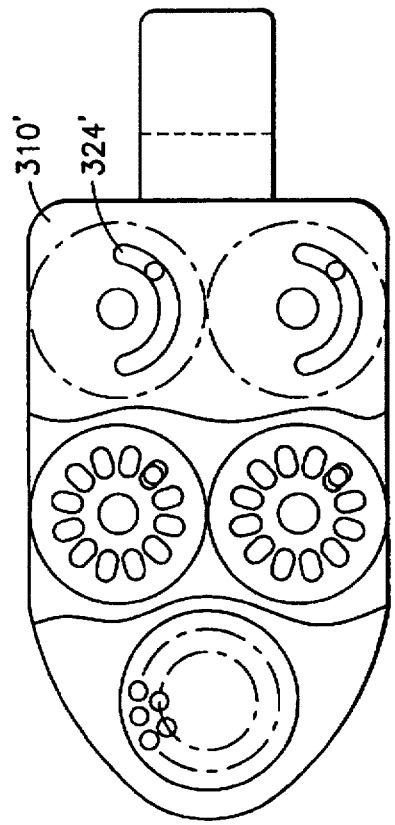
FIG. 11C is a schematic partial bottom view and sectional views similar to FIG. 11B of an alternate embodiment of the apparatus shown in FIG. 11A.

FIG. 11C shows another embodiment. In this embodiment the actuating plate 310' has curved slots 324'. The curved slots 324' provide orbital movement for the cover. FIG. 11D shows a plan top view of an alternate embodiment of another type of actuating plate 310". The actuating plate 310" has two guide slots 330, 332. Each guide slot 330, 332 is located on an opposite side of the plate 310. Each guide slot 330, 332 is a linear slot and offset from each other 90°. When a drive pin is located in the first guide slot 330, the rotational motion of the drive pin is converted in linear reciprocating movement of the plate 310" in direction M. The plate 310", similar to plate 310 of FIGS. 11A and 11B has a cover with brushes connected to the plate 310". Thus, the brushes are moved in direction M. However, a user can remove the plate 310", flip it 180°, and reconnect the plate 310" with the drive pins now located in slots 332. When the drive pins are rotated, the plate 310" is now reciprocatingly moved in direction N. Thus, the user can select from two alternative types of motion of the brushes. Other types of motion or combinations of motions could also be provided, such as opposite side-by-side linear reciprocating sections and reverse direction rotating sections.

Figure 12:
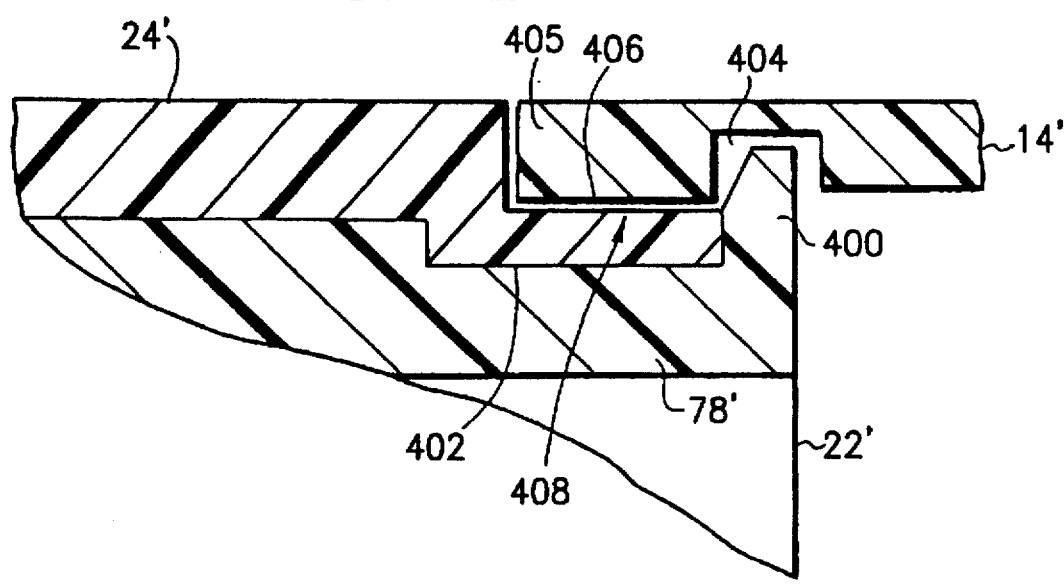
FIG. 12 is a partial cross-sectional view of an alternate embodiment at a rear end of the tool.

Referring now to FIG. 12, a partial cross-sectional view of an alternate embodiment is shown. In this embodiment the rear end of the ledge 78' of the shell 22' has an annular ring section 400, an annular recess 402, and the cover 24' has a reduced thickness at the recess 402. The battery cap 14' has an inner annular recess 404. When the cap 14' is mounted to the ledge 78', the annular ring section 400 is received into the annular recess 404 to removably mechanically interlock the cap on the rear end of the housing. The inner surface 406 of the leading section 405 of the battery cap 14' makes a frictional and sealing engagement with the cover 24' at area 408. The leading section 405 is outwardly deformed in the mounted position shown in FIG. 12. Thus, the leading section 405 compresses against the cover 24' at the area 408. In alternate embodiments, other types of detent mounting systems could be provided.

Figure 13:
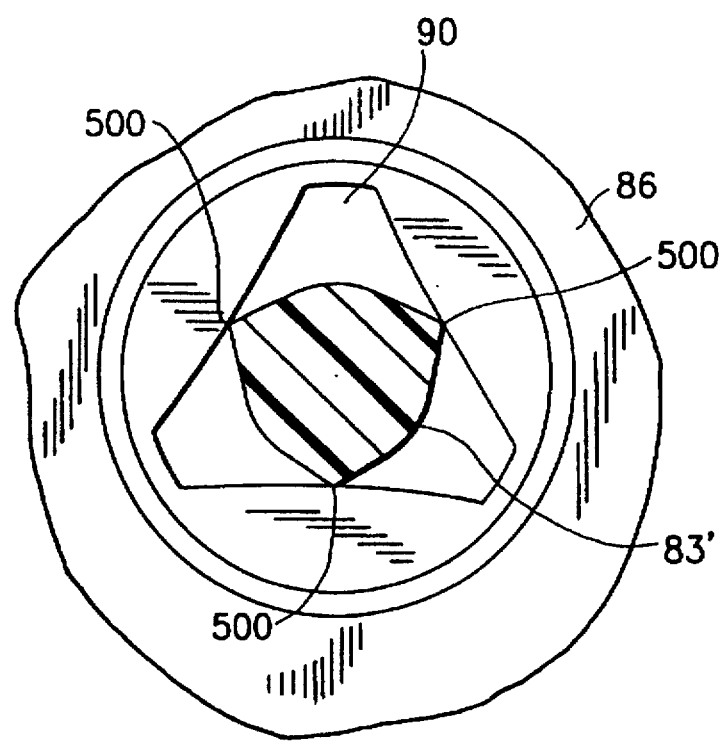
FIG. 13 is a partial top view of a frame of a clearing attachment and a cross-sectional view of an alternate embodiment of a mount.

Referring now to FIG. 13, a partial top view of a cleaning attachment frame 86 similar to FIG. 4D is shown with a cross-sectional view of the shaft 83' of an alternate embodiment in the aperture 90. The shaft 83' has a generally circular profile, but includes three detent sections 500. The detent sections 500 make an interference fit with side walls of the frame 86 in the aperture 90. This helps to prevent unintentional rotation of the frame 86 relative to the shaft 83'.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. In a cleaning apparatus having a housing, a motor located in the housing, and a transmission connecting an output shaft of the motor to a mount for attaching a cleaning attachment, wherein the improvement comprises:

the mount having a leading section with a general triangular block shape and a shaft section, the leading section having three generally triangular shaped cantilevered tips;

the cleaning attachment having a receiving area with a generally triangular shaped aperture through which the leading section of the mount is passed;

the shaft section of the mount is located in the aperture of the cleaning attachment;

the receiving area of the cleaning attachment include three shelves that rest on rear sides of the triangular shaped tips;

the receiving area further having blocks next to the shelves to stop rotation of the leading section of the mount in the receiving area in a first direction.

2. An apparatus as in claim 1 wherein area of contact between the shelves and the rear sides of the tips is sufficiently large to provide sufficient frictional force between the mount and the cleaning attachment to inhibit unintentional rotation of the leading section of the mount in the receiving area in a second direction reverse to the first direction without additional biasing means between the mount and the attachment.

3. An apparatus as in claim 1 wherein contact area between the cleaning attachment and the generally triangular shaped cantilevered tips is sufficiently large to provide sufficient frictional force between the mount and the cleaning attachment to inhibit unintentional rotation of the mount relative to the attachment in a disconnecting direction without additional biasing means between the mount and the attachment.

4. An apparatus as in claim 3 further comprising means for the motor to rotate the mount in the disconnecting direction to disconnect the attachment from the mount.

5. An apparatus as in claim 1 further comprising means for disconnecting the cleaning attachment from the mount without a user contacting the attachment comprising means for reversing a direction of rotation of the mount.

6. In a cleaning attachment for use with a motorized cleaning apparatus, the cleaning attachment having a frame and a cleaning section attached to the frame, the frame having a receiving area for locating an attachment mount of the apparatus therein, wherein the improvement comprises:

the receiving area having a generally triangular shaped aperture through which the attachment mount must pass through to enter the receiving area;

the attachment includes three flat shelves next to the aperture to partially form the aperture; add the attachment by three blocks next to the shelves that partially form the aperture.

7. In a cleaning attachment having a housing, a motor and a cleaning attachment removably connected to the motor by a removable mounting system, wherein the improvement comprises:

a first one of the members of the removable mounting system including a mounting stud having a leading section with a generally triangular block shape and a shaft section located behind the leading section, and a second one of the members of the mounting system having a receiving area with the mounting stud being located therein, the receiving area having a generally triangular shaped aperture into the receiving area through which the leading section of the mounting stud is passed through;

the shaft section of the stud is located in the aperture of the cleaning attachment;

the receiving area of the cleaning attachment by three shelves that rest on rear side of triangular tips of the leading section of the stud; and the receiving area has blocks next to the shelves to stop rotation of the leading section of the stud in the necessary area in a first direction.

8. An apparatus as in claim 7 wherein area of contact between the shelves and the rear sides of the tips is sufficiently large to provide sufficient frictional force between the stud and the cleaning attachment to inhibit unintentional rotation of the leading section of the stud in the receiving area in a second direction reverse to the first direction.

9. An apparatus as in claim 7 wherein contact area between the cleaning attachment and generally triangular shaped cantilevered tips of the stud is sufficiently large to provide sufficient frictional force between the stud and the cleaning attachment to inhibit unintentional rotation of the stud relative to the attachment in a disconnecting direction.

10. An apparatus as in claim 9 further comprising means for the motor to rotate the stud in the disconnecting direction to disconnect the attachment from the stud.

11. An apparatus as in claim 7 further comprising means for disconnecting the cleaning attachment from the stud without a user contacting the attachment comprising means for reversing a direction of rotation of the stud.

12. In a cleaning apparatus having a housing, a motor location in the housing, and a transmission connection an output shaft of the motor to a mount for attachment a cleaning attachment, wherein the improvement comprises:

a selected one of the mount and cleaning attachment having a leading section with a generally triangular block shape and a shaft section, the leading section having three generally triangular shaped cantilevered tips;

the other of the mount and cleaning attachment having a receiving area with a generally triangular shaped aperture through which the leading section of the mount is passed;

the shaft section of the mount is located in the aperture;

the receiving area has three shelves that rest on rear sides of the triangular shaped tips; and the receiving area furthest has blocks next to the shelves to stop rotation of the leading section of the mount in the receiving area in a first direction.

13. An apparatus as in claim 12 wherein area of contact between the shelves and the rear sides of the tips is sufficiently large to provide sufficient frictional force between the mount and the cleaning attachment to inherit unintentiorly rotation of the leading section of the mount in the receiving area in a second direction reverse to the first reaction without additional biasing means between the mount and the attachment.

14. An apparatus as in claim 12 wherein the contact area between the clean attachment and the generally triangular-shaped cantilevered tips is sufficiently large to provide sufficient frictional force between the mount and the cleaning attachment to inhibit unintentional rotation of the mount relative to the attachment in a disconnecting direction without additional biasing means between the mount and the attachment.

* * * * *